United States Patent [19]

Elsbett et al.

[11] Patent Number: 4,781,159
[45] Date of Patent: Nov. 1, 1988

[54] COMPOSITE PISTON FOR USE IN THE CYLINDER OF A DIESEL ENGINE

[76] Inventors: Ludwig Elsbett; Günter Elsbett; Klaus Elsbett, all of Industriestrasse 14-16, D-8543 Hilpoltstein, Fed. Rep. of Germany

[21] Appl. No.: 78,595

[22] Filed: Jul. 28, 1987

[30] Foreign Application Priority Data

Aug. 1, 1986 [DE] Fed. Rep. of Germany ....... 3626129

[51] Int. Cl.⁴ ............................ F02F 3/00; F02F 3/22; F16J 1/00
[52] U.S. Cl. ................................... 123/193 P; 92/239
[58] Field of Search ............ 123/193 P, 41.35; 92/239, 238; 74/49, 579 E; 29/156.5 R, 156.5 A

[56] References Cited

U.S. PATENT DOCUMENTS

| | | | |
|---|---|---|---|
| 4,161,165 | 7/1979 | Belush et al. ..................... | 123/193 P |
| 4,213,438 | 7/1980 | Elsbett et al. .................... | 123/193 P |
| 4,274,372 | 6/1981 | Kelm et al. ....................... | 123/193 P |
| 4,494,501 | 1/1985 | Ludovico .......................... | 123/193 P |

Primary Examiner—Willis R. Wolfe
Assistant Examiner—M. Macy
Attorney, Agent, or Firm—Peter K. Kontler

[57] ABSTRACT

A composite piston for use in the cylinder of a diesel engine has coaxial first and second sections and a piston pin which articulately connects the sections to each other and to the piston pin bushing of the connecting rod. The first section has a round head and two piston pin bosses which are connected to the head by a hollow frustoconical portion of the first section. The bosses are reinforced by two walls each of which is integral with each boss. The walls are mirror symmetrical to each other with reference to a plane which includes the axes of the piston pin and of the composite piston. The inner sides of the walls are cooled by sprays or streams of a liquid coolant which flows through apertures provided in the walls close to the frustoconical connecting portion and serving to permit the coolant to thereupon flow along the outer sides of the respective walls. The reinforcing walls prevent the bosses from creeping away from each other in the axial direction of the piston pin or to be tilted relative to the pin and to thereby exert excessive pressure against those portions of the pin which are adjacent the outermost portions of the openings in the bosses.

11 Claims, 1 Drawing Sheet

COMPOSITE PISTON FOR USE IN THE CYLINDER OF A DIESEL ENGINE

CROSS-REFERENCE TO RELATED CASES

The composite piston of the present invention is similar to those disclosed in the commonly owned U.S. Pat. No. 4,593,660 granted June 10, 1986 to Ludwig and Günter Elsbett for "Piston drive for use in diesel engines and the like". The mode of cooling portions of the improved composite piston is or can be similar to the cooling technique disclosed in the commonly owned copending patent application Ser. No. 710,864 filed March 12, 1985 by Ludwig, Günter and Klaus Elsbett for "Internal combustion engine with reduced noise and heat emission," now U.S. Pat. No. 4,715,335. The disclosures of the above patent and of the above patent application are incorporated herein by reference.

BACKGROUND OF THE INVENTION

The present invention relates to engines in general, and more particularly to improvements in cylinder and piston units of internal combustion engines, especially diesel engines. Still more particularly, the invention relates to improvements in composite pistons of the type disclosed in the aforementioned commonly owned U.S. Pat. No. 4,593,660.

The patent discloses a composite piston having a first section which serves to seal the interior of the cylinder from fuel and gaseous combustion products, and a second or inner section which serves to guide the piston in the cylinder. The second section is designed to take up lateral stresses, and the two sections are connected to the respective end portion of the connecting rod by a common piston pin. An advantage of a composite piston is that its sections can be made of different materials. For example, the first section can be made of iron and the second section can be made of aluminum or an aluminum alloy. The sealing and thermal insulating properties of a section which is made of iron are highly satisfactory. On the other hand, a section which is made of aluminum or an aluminum alloy exhibits highly satisfactory heat conductivity and is readily slidable along the internal surface of the cylinder. Such optimum selection of the materials of the two sections contributes to longer useful life and stability of the composite piston, and the first section can be acted upon by fluids (particularly gases) at elevated pressure, i.e., at a pressure which is to be expected in a modern diesel engine. In order to further enhance the stability of the first section, while at the same time reducing the weight of such section, the first section is preferably dimensioned and configurated in a manner as disclosed in the U.S. Pat. No. 4,593,660, namely so that imaginary straight lines which extend from the exposed side of the head of the first section to the piston pin bushing of the connecting rod do not intersect the exposed surfaces of the head and the portion (preferably in the form of a hollow conical frustum) which connects the head with the piston pin bosses of the first section.

Stresses which develop as a result of the application of elevated gas pressure to the head of the first piston section are transmitted to the piston pin exclusively by the bosses of the first section. Thus, the bosses are compelled to take up and to transmit extremely large forces which are likely to cause breakage, distortion and/or misalignment of the bosses with attendant destruction of the entire piston-cylinder unit or seizing of the piston pin. It has been found that a mere addition of material to reinforce the bosses does not suffice to ensure the retention of bosses in optimum positions with reference to the piston pin, expecially in a modern diesel engine wherein the head of the first section of the composite piston is subjected to extremely high pressures. Moreover, a mere addition of bulk and weight to the bosses is undesirable on the additional ground that the trend is toward the utilization of lightweight pistons, even in diesel engines of the aforediscussed design wherein the head of the first piston section must stand elevated pressures.

The bosses of heretofore known piston sections are subjected to elevated static pressures as well as to pronounced thermal stresses. The static pressures develop as a result of the application of elevated gas pressure to the head of the first section of the composite piston which results in a tendency of the bosses to migrate in the axial direction of the piston pin and away from each other. Attempts to simply extend the bosses in the circumferential direction of the cylinder have failed because of the pronounced temperature differential between the regions near to and the regions remote from the aforementioned connecting portion between the head and the bosses of the first section of the composite piston. The temperature of the bosses increases very rapidly in a direction from the piston pin toward the head of the first section. In the absence of any action to the contrary, static forces which develop as a result of the application of elevated gas pressures to the head of the first section will tend to spread the bosses apart and to establish highly localized points of transmission of elevated pressure between the inner portions of the bosses and the peripheral surface of the pin. This can entail serious damage to or destruction of small portions of the surfaces surrounding the openings which are provided in the bosses for the piston pin. When the pressure upon the exposed surface of the head decreases, the bosses are acted upon primarily by thermal stresses due to pronounced temperature differences between the portions nearer to and the portions more distant from the head so that the free end portions of the bosses tend to move toward each other, i.e., the inclination of the bosses with reference to the axis of the pin changes and the pin is likely to jam. Excessive stressing is then shifted from the innermost to the outermost portions of internal surfaces which surround the openings of the bosses.

The piston pin should retain its freedom of movement (rotation) relative to the piston sections under any and all circumstances because any interference with such freedom of rotation will entail the development of pronounced localized stresses upon relatively small portions of the peripheral surface of the pin. This can destroy the layers of lubricant which coat the periphery of the pin and the internal surfaces of the bosses. It is equally important to ensure that the piston pin be free to turn relative to the piston pin bushing of the connecting rod. On the other hand, the piston pin must be received in the bushing and in the bosses with a minimum of play so that even minute changes in mutual spacing of the bosses can entail an elimination of such play with the aforediscussed undesirable consequences as regards seizing of the pin, destruction of the film of lubricant and/or material damage to and destruction of the pin, bosses and/or bushing. At any rate, the useful life of the bosses is unduly affected if they are free or compelled to travel axially of the piston pin toward or away from each other (depending upon whether they are subjected to thermal stresses or static pressures). As a rule, the clearance between the pin on the one hand and the internal surfaces of the bushing of the connecting rod and the bosses of the first section of the composite piston on the other hand is less than one thousandth of the diameter of the pin.

OBJECTS AND SUMMARY OF THE INVENTION

An object of the invention is to provide a composite piston wherein the piston pin can retain its freedom of movement relative to the sections of the piston and/or relative to the connecting rod under all foreseable circumstances.

Another object of the invention is to provide a novel and improved piston section which is constructed and configured in such a way that its piston pin bosses do not exhibit a tendency to move axially of the pin toward or away from each other in response to the application of thermal stresses and/or static forces.

A further object of the invention is to provide novel and improved means for reinforcing the bosses of the above outlined section of the composite piston.

Still another object of the invention is to provide a piston wherein the layers of lubricant on the piston pin and in the bosses of that piston section which is designed to stand elevated gas pressures remain intact, even if the pressure of gases is very high and even if the piston is required to operate at elevated temperatures.

An additional object of the invention is to provide a piston section wherein those portions which could adversely affect the stability and/or mutual positions of the bosses are cooled in a novel and improved way.

A further object of the invention is to provide an engine which embodies the above outlined piston and piston rod section.

Another object of the invention is to provide a novel and improved method of preventing deformation and/or misalignment of piston pin bosses in a composite piston for diesel engines and the like.

An additional object of the invention is to provide a piston which can be used with advantage in existing cylinders of internal combustion engines.

The invention is embodied in a composite piston which can be used in the cylinder of an internal combustion engine, particularly a diesel engine. The composite piston comprises coaxial first and second sections which are disposed end to end and the first section includes a head, two spaced-apart piston pin bosses having registering openings, means for connecting the head with the bosses, and at least one reinforcing wall which directly connects the bosses to each other in addition to the connection which is established by way of the connecting means. The piston further comprises a piston pin which is disposed in the openings of the bosses and articulately connects the bosses with the second section and preferably also with one end portion of a connecting rod the other end portion of which is coupled to the crankshaft of the engine. The first section preferably comprises two reinforcing walls which are disposed at opposite sides of the piston pin. The arrangement is preferably such that the bosses are mirror symmetrical to each other with reference to a first plane which is normal to the axis of the piston pin and includes the common axis of the two sections, and that the reinforcing walls are mirror symmetrical to each other with reference to a second plane which includes the axes of the composite piston and the piston pin.

Each reinforcing wall has an edge face which faces away from the head (i.e., toward the second section of the composite piston) and is preferably located at a predetermined level, namely between the axis of the piston pin and those portions of internal surfaces of the bosses (such surfaces bound the openings of the respective bosses) which are nearest to the head.

Each reinforcing wall can be formed with one or more apertures (e.g., in the form of circular holes or bores) which are adjacent the connecting means. The connecting means can comprise a frustoconical portion which tapers in a direction from the marginal or peripheral portion of the head toward the bosses of the first section.

The composite piston preferably further comprises means for cooling the reinforcing wall or walls of the first section with a liquid coolant (e.g., oil). Each reinforcing wall has an inner side which faces the piston pin and an outer side which faces away from the piston pin, and the cooling means can comprise one or more nozzles for directing jets or sprays of coolant against one side of each reinforcing wall so that the coolant flows along the one side, thereupon through the aforementioned aperture or apertures and thereafter along the other side of the respective reinforcing wall. It is presently preferred to direct sprays or jets of coolant against the inner side of each reinforcing wall, preferably in such a way that the entire inner side is contacted by the admitted coolant.

The first section of the composite piston further includes an annular skirt which extends from the peripheral or marginal portion of the head in a direction toward the second section and surrounds the aforementioned connecting means between the head and the bosses of the first section.

The novel features which are considered as characteristic of the invention are set forth in particular in the appended claims. The improved composite piston itself, however, both as to its construction and the mode of assembling and cooling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
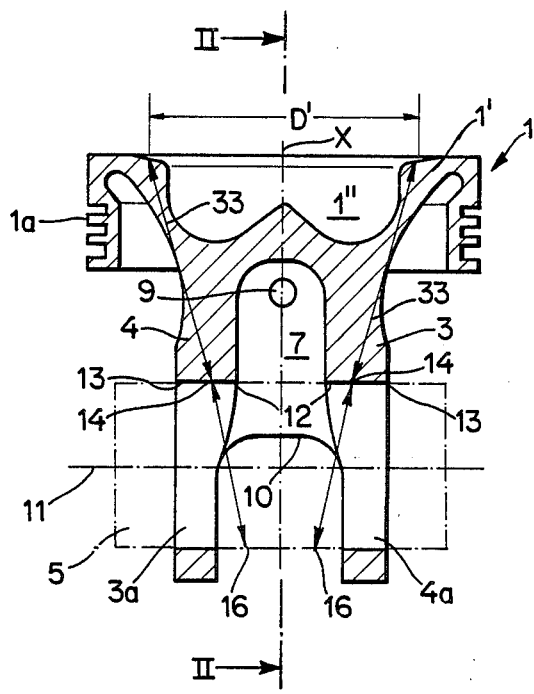
FIG. 1 is an axial sectional view of the first section of a composite piston which embodies one form of the invention, the piston pin being indicated by phantom lines.
Figure 2:
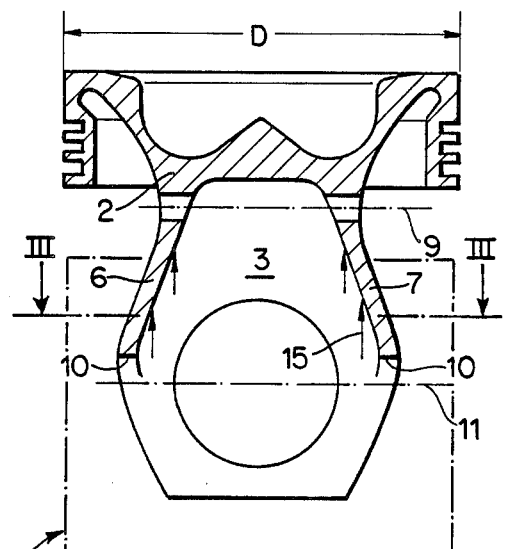
FIG. 2 is an axial sectional view of the first section as seen in the direction of arrows from the line II—II of FIG. 1.
Figure 3:
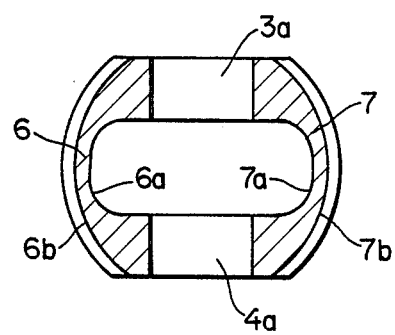
FIG. 3 is a sectional view of the bosses and reinforcing walls as seen in the direction of arrows from the line III—III of FIG. 2.

FIGS. 1 to 3 show certain details of a composite piston for use in the cylinder of an internal combustion engine, particularly a diesel engine. The piston includes a first section 1, a second section which can be identical with or similar to the section 2 of the piston shown in FIGS. 1 and 2 of U.S. Pat. No. 4,593,660, and a piston pin 5 (indicated in FIG. 1 by phantom lines) which serves to connect the second section of the piston with the first section 1 as well as with the piston pin bushing of a connecting rod (such as the connecting rod 5 in FIGS. 1-2 of U.S. Pat. No. 4,593,660).

The exposed surface of the head 1' of the first piston section 1 has a combustion chamber 1" and the marginal or peripheral portion of the head 1' is integral with an annular skirt 1a extending toward the second section of the composite piston and surrounding a rotationally symmetrical frustoconical connecting portion 2 between the marginal portion of the head 1' and the adjacent ends of two mirror symmetrical piston pin bosses 3, 4 having registering circular openings 3a, 4a for the pin 5. The connecting portion 2 is a hollow conical frustum which is preferably designed and dimensioned in a manner as disclosed in the commonly owned '660 patent. The mirror symmetrical imaginary lines 33 correspond to the lines 33 shown in FIGS. 1, 3 and 5 of U.S. Pat. No. 4,593,660 and are thus located entirely within the confines of the head 1' and connecting portion 2. Those ends of the lines 33 which intersect the exposed surface of the head 1' are located at the same distance from the axis X of the piston. The points of intersection are located on a circle having a diameter D' which equals or closely approximates 0.7 D (the diameter of the head 1'). The two points of intersection of each of the lines 33 with the peripheral surface of the piston pin 5 are shown at 14 and 16. The points 14 of intersection are located substantially midway between the inner and outer ends of the topmost portions of internal surfaces of the bosses 3, 4 (i.e., those portions of these surfaces which are nearest to the head 1'). The points 16 of intersection are located between the free end portions of the bosses 3 and 4. With reference to the piston pin bushing of the connecting rod, the points 16 of intersection are disposed in the same way as described in U.S. Pat. No. 4,593,660.

In accordance with a feature of the invention, the section 1 of the composite piston further comprises two reinforcing walls 6 and 7 which are integral with the connecting portion 2 as well as with the bosses 3, 4 and are mirror symmetrical to each other with reference to a plane which includes the axis 11 of the pin 5 and the axis X of the piston. Each of the reinforcing walls 6, 7 has a circular aperture or port 9 which is adjacent the connecting portion 2 and provides a path for the flow of a liquid coolant (oil) from the inner sides 6a, 7a to the outer sides 6b, 7b of the respective reinforcing walls and thereupon along the outer sides 6b, 7b. The means for directing sprays or jets 15 against the entire inner sides 6a, 7a of the reinforcing walls can be constructed and installed in a manner as disclosed in the aforementioned commonly owned copending patent application Ser. No. 710,864 now U.S. Pat. No. 4,715,335.

The reinforcing walls 6 and 7 stabilize the bosses 3, 4 under all operating conditions. The edge faces 10 of the reinforcing walls 6, 7 are located between the axis 11 of the piston pin 5 and the aforementioned topmost portions of internal surfaces which surround the registering openings 3a, 4a of the bosses 3, 4 (i.e., those portions of the internal surfaces which are nearest to the head 1' of the piston section 1). It has been found that the edge faces 10 of the reinforcing walls 6 and 7 should not be too remote from the axis 11 of the pin 5 because this could result in the application of excessive stresses at the innermost points 12 of the aforementioned topmost portions of internal surfaces of the bosses 3 and 4 whereby the bosses would tend to migrate away from each other in the axial direction of the pin 5. On the other hand, if the edge faces 10 are too close to the topmost portion of internal surfaces of the bosses 3 and 4, the outermost points 13 of such surface portions are subjected to very pronounced stresses because the temperature of reinforcing walls 6 and 7 in the regions of their respective edge faces 10 is much lower than at the levels of the respective apertures 9 for the flow of liquid coolant from the inner sides 6a, 7a toward and along the outer sides 6b, 7b. This entails a tilting of the bosses 3 and 4 in such a way that their free end portions move toward each other and the points 13 of the surfaces bounding the openings 3a, 4a apply an excessive pressure to the adjacent portions of the peripheral surface of the pin 5.

The diameters (cross-sectional areas) of the apertures 9 can be selected with a view to enable a large quantity of liquid coolant to pass from the inner sides 6a, 7a of the reinforcing walls 6, 7 toward the respective outer sides 6b, 7b so as to reduce the likelihood of the development of pronounced temperature differences between the edge faces 10 and the regions of the apertures 9 whereby the bosses 3 and 4 are less likely to be tilted and to exert excessive pressure at 13. It is possible to provide each reinforcing wall with several apertures of different sizes and to plug one or more selected apertures in order to ensure the establishment of an optimum flow rate of coolant between the inner and outer sides of the respective walls. Adequate and predictable cooling of the walls 6, 7 greatly reduces the tendency of the bosses 3 and 4 to change their inclination and to seize the piston pin 5 at or close to the points 13. The placing of edge faces 10 substantially or approximately midway between the axis 11 and the line connecting the points 12 and 13 has been found to result in proper cooling of the reinforcing walls 6 and 7, especially if the coolant is supplied at a rate which suffices to adequately cool the entire or practically entire inner sides 6a and 7a. The distance of the upper (apertured) ends of the reinforcing walls 6 and 7 from the head 1' is determined by the configuration and dimensions of the connecting portion 2, i.e., such a configuration of the head 1' and portion 2 which ensures that the lines 33 do not intersect the external and/or internal surfaces of the head 1' and connecting portion 2 anywhere between the upper surface of the head and the openings 3a, 4a. Proper selection of the length of the reinforcing walls 6, 7 and an adequate cooling of these walls will prevent undesirable shifting of the locations of thermal and static engagement between the bosses 3, 4 on the one hand and the peripheral surface of the pin 5 on the other hand.

Figure 4:
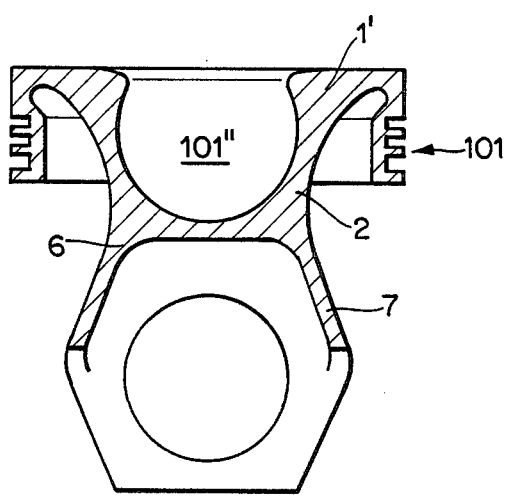
FIG. 4 is an axial sectional view of a modified first section of a composite piston which embodies the invention.

The configuration of the combustion chamber 1" in the head 1' of the piston section 1 of FIGS. 1-3 is such that it can receive several jets or sprays of fuel which is to be combusted at an elevated pressure. FIG. 4 shows a modified first piston section 101 which differs from the piston section 1 of FIGS. 1-3 primarily or exclusively in that it is provided with a spherical combustion chamber 101" for a single spray of fuel, such as diesel oil.

An important advantage of the improved piston section 1 or 101 and of the composite piston which embodies such piston section is that the bosses 3 and 4 are prevented from creeping in the axial direction away from each other under the action of elevated gas pressures in the region of the combustion chamber as well as that the bosses are not likely to migrate toward each other under the action of thermal stresses which would or would be likely to develop in the absence of adequate cooling of the reinforcing walls 6 and 7 so that the temperature differential between the regions of the edge faces 10 and the apertures 9 would be excessive.

Another important advantage of the improved piston and piston section 1 or 101 is that the bosses 3 and 4 are held against undesirable movements in the axial direction of the piston pin even though they need not be reinforced by the addition of excessive or large quantities of material. Thus, the combined mass of the reinforcing walls 6 and 7 is or can be much less than the quantities of material which would have to be added to the bosses 3 and 4 in order to reduce their tendency to move relative to each other in response to the application of pronounced static pressures and/or thermal stresses. Adequate cooling of large portions of the inner and/or outer sides of the reinforcing walls 6 and 7 greatly reduces the likelihood of the development of internal stresses which could affect mutual spacing and inclination of the bosses 3, 4 and could adversely affect the useful life of the piston section 1 or 101. It was found that the provision of reinforcing walls which extend all the way between the bosses 3 and 4 (i.e., downwardly and well beyond the axis 11, as seen in FIG. 1) is less satisfactory than the aforedescribed dimensioning of the reinforcing walls so that the edge faces 10 are located between the axis 11 and the apertures 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A composite piston for use in the cylinder of an engine, particularly a diesel engine, comprising a first section arranged to seal the interior of the cylinder from the fuel and gaseous combustion products and a section arranged to guide the piston in the cylinder, said first section including a head, two spaced-apart piston pin bosses having registering openings, connecting means for connecting said head with said bosses, and at least one reinforcing wall connecting said bosses to each other, and further comprising a piston pin disposed in said openings and pivotally coupling said bosses with said second section.

2. The composite piston of claim 1, wherein said first section comprises two reinforcing walls at opposite sides of said piston pin.

3. The composite piston of claim 1, wherein said bosses have internal surfaces bounding the respective openings and each of said surfaces has a portion nearest to said head, said pin having an axis and said reinforcing wall having an edge face intermediate said axis and said portions of said surfaces.

4. The composite piston of claim 1, wherein said reinforcing wall has at least one aperture adjacent said connecting means.

5. The composite piston of claim 4, wherein said connecting means includes a frustoconical portion which tapers in a direction from said head toward said bosses.

6. The composite piston of claim 1, further comprising means for cooling said reinforcing wall with a liquid coolant.

7. The composite piston of claim 6, wherein said reinforcing wall has an inner side facing said pin, an outer side facing away from said pin and at least one aperture between said inner and outer sides in the region of said connecting means, said cooling means having means for directing the coolant against one of said sides so that the coolant flows toward and into said aperture.

8. The composite piston of claim 7, wherein said means for directing includes means for directing the coolant against the inner side of said reinforcing wall so that the coolant flows toward and through said aperture and thereupon along said outer side.

9. The composite piston of claim 7, wherein said pin has an axis and said bosses have internal surfaces bounding the respective openings and including portions nearest to said head, said reinforcing wall having an edge face intermediate said axis and said portions of said surfaces, said directing means including means for directing the coolant against the major portion at least of said one side of said reinforcing wall.

10. The composite piston of claim 1, wherein said head includes a radially outermost marginal portion and said first section further comprises an annular skirt integral with said marginal portion and surrounding said connecting means.

11. The composite piston of claim 1, wherein said pin has an axis and said bosses are mirror symmetrical to each other with reference to a plane which is normal to the axis of said pin, said first section including two reinforcing walls which are mirror symmetrical to each other with reference to a plane including said axis.

* * * * *